US010495904B2

(12) United States Patent
Sako et al.

(10) Patent No.: US 10,495,904 B2
(45) Date of Patent: Dec. 3, 2019

(54) PAIR OF CONTACT LENSES, CONTACT LENS AND STORAGE MEDIUM

(71) Applicant: SONY CORPORATION, Tokyo (JP)

(72) Inventors: Yoichiro Sako, Tokyo (JP); Kazunori Hayashi, Tokyo (JP); Takatoshi Nakamura, Tokyo (JP); Tomoya Onuma, Shizuoka (JP); Takayasu Kon, Tokyo (JP); Akira Tange, Tokyo (JP); Hiroyuki Hanaya, Kanagawa (JP); Masakazu Yajima, Chiba (JP); Kohei Asada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 130 days.

(21) Appl. No.: 15/785,482

(22) Filed: Oct. 17, 2017

(65) Prior Publication Data
US 2018/0039100 A1 Feb. 8, 2018

Related U.S. Application Data

(62) Division of application No. 14/781,130, filed as application No. PCT/JP2014/054575 on Feb. 25, 2014, now Pat. No. 9,810,926.

(30) Foreign Application Priority Data

May 9, 2013 (JP) .................................. 2013-099383

(51) Int. Cl.
G02C 7/04 (2006.01)
G02C 11/00 (2006.01)

(52) U.S. Cl.
CPC ................ G02C 11/10 (2013.01); G02C 7/04 (2013.01)

(58) Field of Classification Search
CPC ............ G02C 7/04; G02C 7/083; G02C 7/049
USPC ......................................... 351/159.02, 159.03
See application file for complete search history.

(56) References Cited

U.S. PATENT DOCUMENTS

| 9,050,185 B2* | 6/2015 | Pugh ......................... G02C 7/04 |
| 2003/0020477 A1 | 1/2003 | Goldstein |
| 2010/0103369 A1 | 4/2010 | Pugh et al. |
| 2011/0084834 A1 | 4/2011 | Sabeta |
| 2014/0240656 A1 | 8/2014 | Pugh et al. |

FOREIGN PATENT DOCUMENTS

| CN | 102804032 A | 11/2012 |
| WO | 2008/109867 A2 | 9/2008 |
| WO | 2011/067391 A1 | 6/2011 |

OTHER PUBLICATIONS

Extended European Search Report of EP Patent Application No. 14795063.8, dated Dec. 12, 2016, 7 pages.

(Continued)

Primary Examiner — Hung X Dang
(74) Attorney, Agent, or Firm — Chip Law Group

(57) ABSTRACT

To provide a contact lens and a storage medium enabling a pair of contact lenses to operate in coordination with each other. Provided is a pair of contact lenses including: a pair of lens parts configured to be worn on respective eyeballs of both eyes; a first function unit provided to one of the pair of lens parts; and a second function unit provided to the other one of the pair of lens parts, the second function unit having a function different from a function of the first function unit.

9 Claims, 14 Drawing Sheets

(56) References Cited

OTHER PUBLICATIONS

Office Action for CN Patent Application No. 201480019662.1, dated Mar. 16, 2017, 07 pages of Office Action and 05 pages of English Translation.
Notice of Allowance for U.S. Appl. No. 14/781,130, dated Jun. 28, 2017, 09 pages.

* cited by examiner

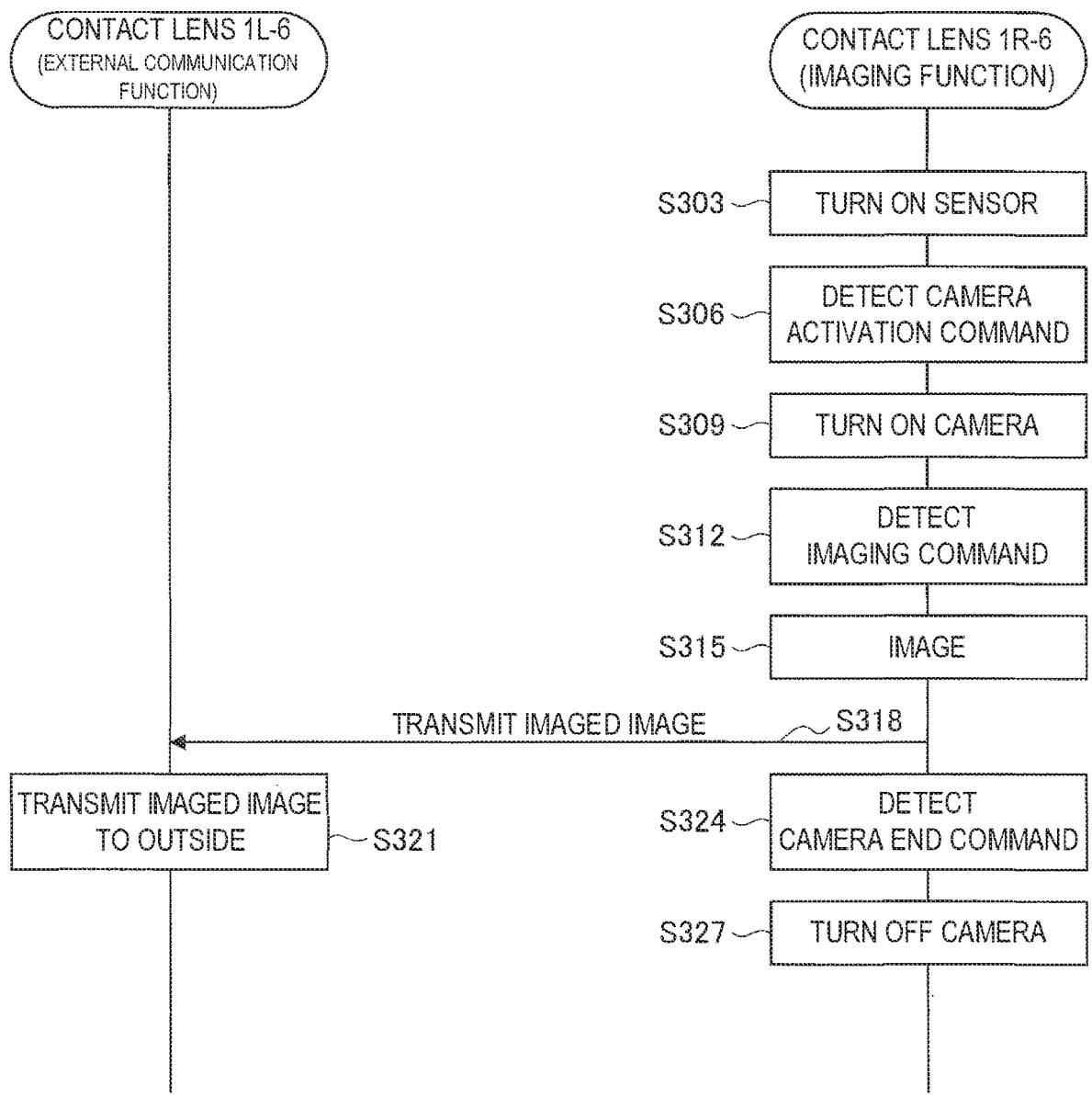

PAIR OF CONTACT LENSES, CONTACT LENS AND STORAGE MEDIUM

CROSS REFERENCE TO RELATED APPLICATION

The present application is a divisional application of U.S. patent application Ser. No. 14/781,130, filed Sep. 29, 2015, now U.S. Pat. No. 9,810,926, which is a National Stage Entry of POT Application PCT/JP2014/054575 filed on Feb. 25, 2014, and claims the priority from prior Japanese Priority Patent Application JP 2013-099383 filed in the Japan Patent Office on May 9, 2013, the entire content of which is hereby incorporated by reference.

TECHNICAL FIELD

The present disclosure relates to a pair of contact lenses, a contact lens and a storage medium.

BACKGROUND ART

Contact lenses are vision correction devices applied directly on eyeballs, which have been practically used recently. In addition to the vision correction purpose, the contact lenses have also been used for the purpose of changing the appearance of eyes. For the latter purpose, the lenses are tinted.

The tinted contact lenses (colored contact lenses) have been increasingly used recently. Users decide what color of lenses is good for themselves typically by actually trying on colored contact lenses to check the appearance of their eyes with the contact lenses on. Patent Literature 1 discloses a system providing a user with a simulated appearance of the user with colored contact lenses on in order to reduce economic and material waste of trial contact lenses.

In addition, Patent Literature 2 recently discloses an image display using a contact lens. Specifically, Patent Literature 2 proposes a thinner image display including a display unit and a lens array part integrally provided on a curved surface, and having an eye-wearable shape like a contact lens as a whole.

CITATION LIST

Patent Literature

Patent Literature 1: JP 2010-211210A
Patent Literature 2: JP 2006-292883A

SUMMARY OF INVENTION

Technical Problem

However, Patent Literature 1 and 2 does not describe any configuration to cause a pair of contact lenses worn on respective eyeballs of both eyes to operate in coordination with each other.

Accordingly, the present disclosure provides a novel and improved pair of contact lenses, a contact lens and a storage medium enabling the pair of contact lenses to operate in coordination with each other.

Solution to Problem

According to the present disclosure, there is provided a pair of contact lenses including: a pair of lens parts configured to be worn on respective eyeballs of both eyes; a first function unit provided to one of the pair of lens parts; and a second function unit provided to the other one of the pair of lens parts, the second function unit having a function different from a function of the first function unit.

According to the present disclosure, there is provided a contact lens including: a lens part configured to be worn on an eyeball; a function unit provided to the lens part; a communication unit that is provided to the lens part and is capable of communicating with an external device; and a control unit that performs control in a manner that the function unit operates in coordination with the external device in accordance with information that the communication unit receives from the external device.

According to the present disclosure, there is provided a storage medium having a program stored therein, the program causing a computer to function as: a function unit provided to a lens part configured to be worn on an eyeball; a communication unit that is provided to the lens part and that is capable of communicating with an external device; and a control unit that performs control in a manner that the function unit operates in coordination with the external device in accordance with information that the communication unit receives from the external device.

Advantageous Effects of Invention

As has been described above, the present disclosure enables a pair of contact lenses to operate in coordination with each other.

BRIEF DESCRIPTION OF DRAWINGS

FIG. 14 is a sequence diagram illustrating exemplary coordinated processing according to the sixth embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be given in the following order.
1. Outline of contact lenses according to an embodiment of the present disclosure
2. Embodiments
2-1. First embodiment
2-2. Second embodiment
2-3. Third embodiment
2-4. Fourth embodiment
2-5. Fifth embodiment
2-6. Sixth embodiment
3. Conclusion «1. Outline of Contact Lenses According to an Embodiment of the Present Disclosure»

Figure 1:
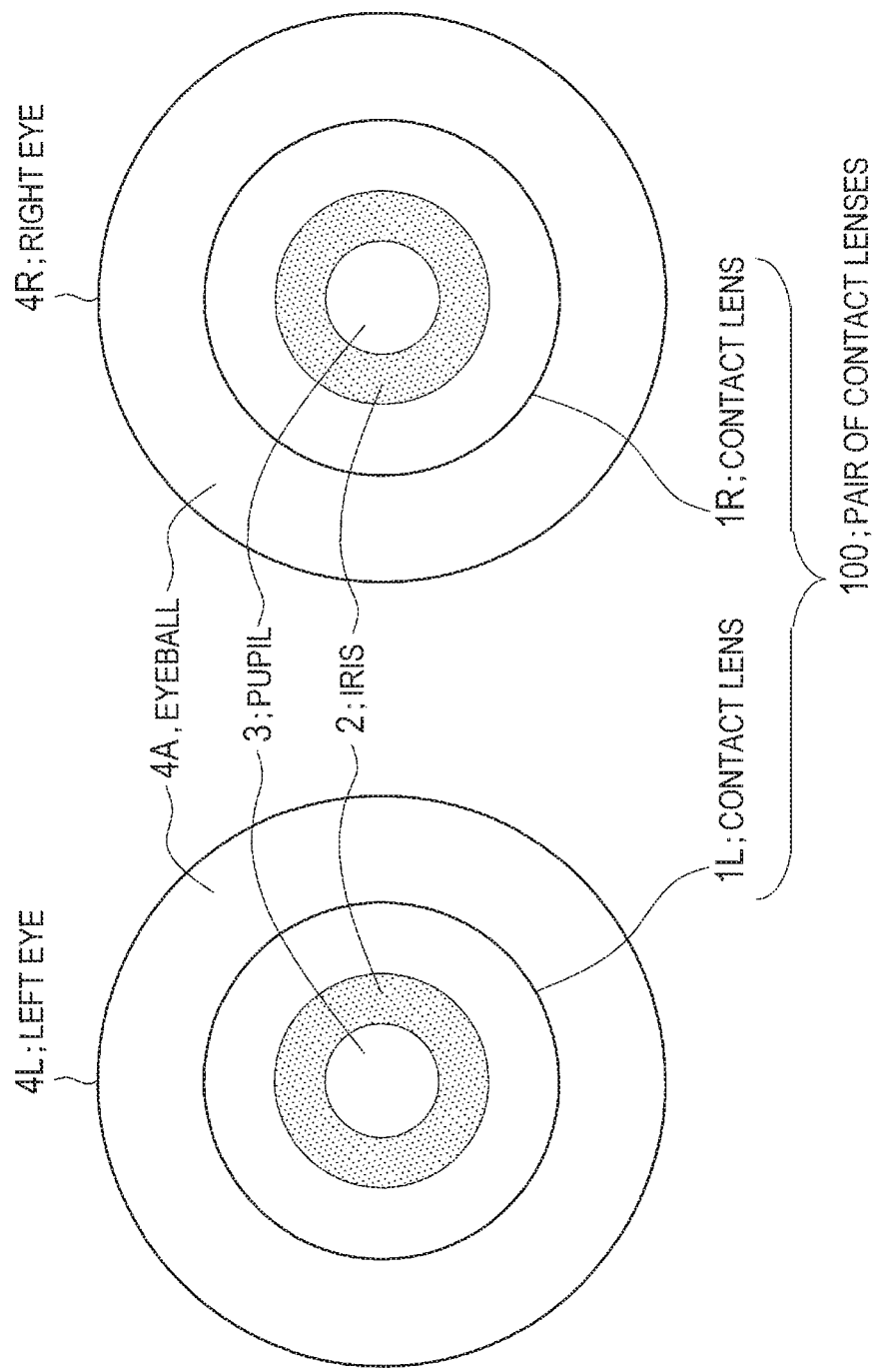
FIG. 1 is a diagram for illustrating an outline of a pair of contact lenses according to an embodiment of the present disclosure.

Firstly, with reference to FIG. 1, description will be given of an outline of a pair of contact lenses 100 according to an embodiment of the present disclosure. FIG. 1 is a diagram for illustrating an outline of the pair of contact lenses 100 according to an embodiment of the present disclosure. As shown in FIG. 1, the pair of contact lenses 100 is a contact lens set including a contact lens 1R to be worn on a right eye 4R and a contact lens 1L to be worn on a left eye 4L.

Each of the contact lenses 1R and 1L, which is formed of a lens part having a curved surface shape, can be worn on an eyeball 4A so as to cover an iris 2 and a pupil 3 as a whole and can be taken off from the eyeball 4A. Note that, in the following description, the contact lenses 1R and 1L will be collectively referred to as contact lenses 1, when it is not necessary to distinguish therebetween.

(Background)

As described above, there have recently been a growing number of users who wear prescription contact lenses for vision correction as well as colored contact lenses to change the appearance of eyes. In addition, improving the functionality of such daily use contact lenses has also been proposed.

However, it has not been proposed to cause a pair of contact lenses worn on both eyes to operate in coordination with each other.

By taking into account these circumstances, highly-functional contact lenses according to embodiments of the present disclosure are created. According to each embodiment of the present disclosure, one of the contact lenses operates in coordination with the other one of the contact lenses that is worn on the other eye and that has a different function, thus enabling to make the contact lenses intelligent and to significantly improve the convenience thereof.

Hereinafter, with reference to FIG. 2, specific description will be given of a basic configuration of contact lenses according to each of the embodiments.

<1-1. Appearance Configuration>

Figure 2:
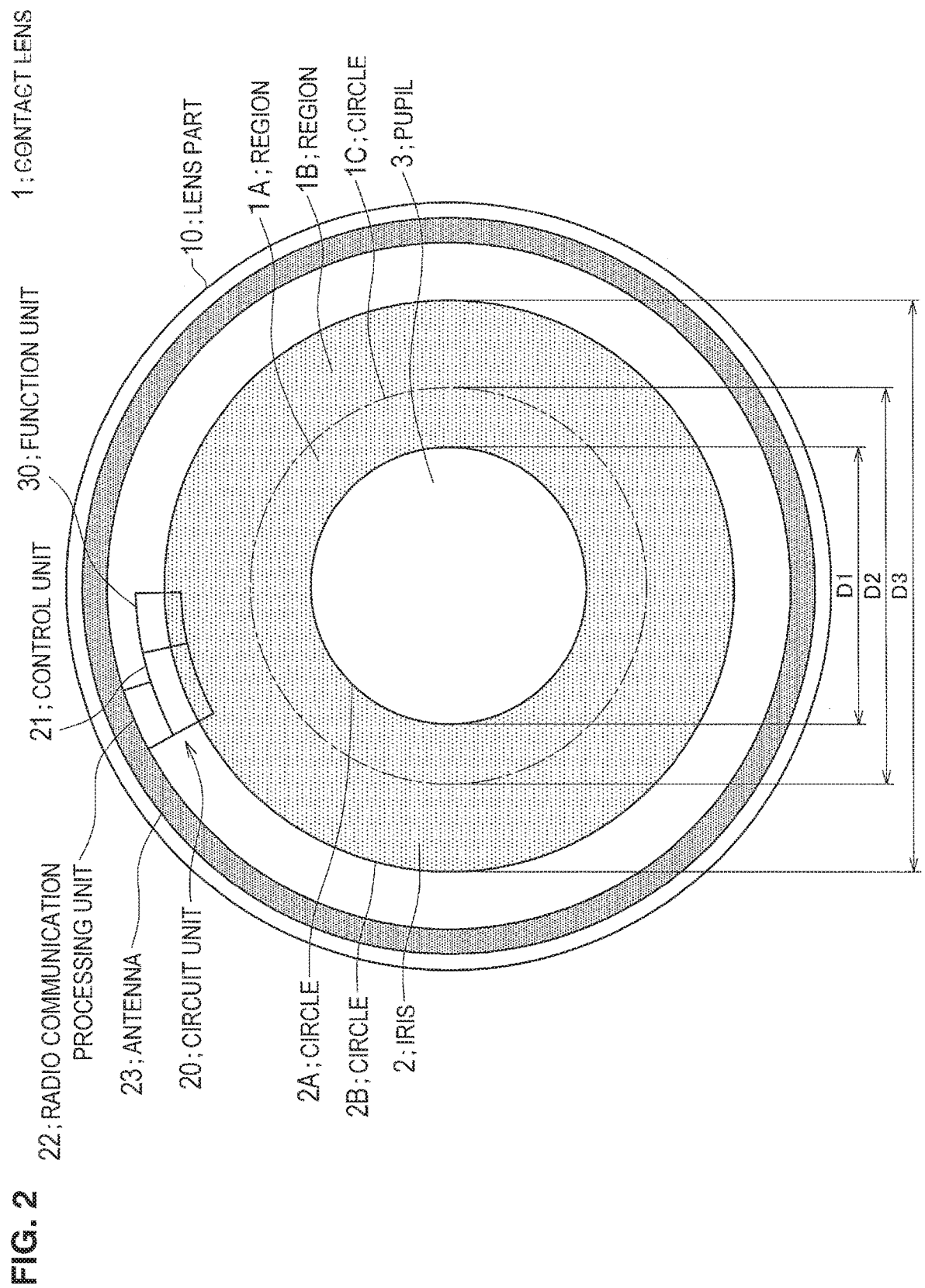
FIG. 2 is a plane view showing an exemplary appearance configuration of a contact lens according to an embodiment of the present disclosure.

FIG. 2 is a plane view showing an exemplary appearance configuration of a contact lens 1 according to an embodiment of the present disclosure. As shown in FIG. 2, the contact lens 1 according to the embodiment is formed of a lens part 10 worn on an eyeball, and, as viewed from the front of the eyeball, is divided by a circle 1C into a region 1A inside the circle 1C and a region 1B outside the circle 1C. The circle 1C has a diameter D2 approximately equal to or larger than a diameter D1 which is the maximum diameter of an inner circumferential circle 2A of the iris 2 of a human eye.

In the region 1B outside the circle 1C, a circuit unit 20 is provided. A smoothing part formed of a material such as a transparent synthetic resin is formed on an outer side (side opposite from a side having a surface, contacting the eyeball, of the lens part 10) of the circuit unit 20. This allows a user wearing the contact lenses 1 to smoothly move his/her eyelids.

As shown in FIG. 2, the circuit unit 20 according to the embodiment includes a control unit 21, a radio communication processing unit 22, an antenna 23 and a function unit 30. Hereinafter, description will be given of these components.

(Control Unit 21)

The control unit 21, which is formed, for example, of a microcomputer (microchip or IC chip) including a central processing unit (CPU), read only memory (ROM) and random access memory (RAM), controls the components of the circuit unit 20.

Specifically, the control units 21 according to the embodiment control the function units 30 (a first function unit 30R and a second function unit 30L) provided respectively to the pair of contact lenses 100 and having mutually different functions so that the function units 30 can operate in coordination with each other.

(Radio Communication Processing Unit 22 and Antenna 23)

The antenna 23, which is provided, for example, at the outer periphery of the region 1B of the lens part 10 as shown in FIG. 1, is connected by radio to the other one (example of an external device), worn on the other eye, of the contact lenses 1, and has a data transmission and reception function.

The radio communication processing unit 22 has a function of performing various kinds of signal processing on the data transmitted and received by the antenna 23.

(Function Unit 30)

The function unit 30 performs a predetermined function according to control by the control unit 21. The function unit 30 performs at least any of an imaging function, a display function, various sensor functions (including an UI function), an illumination function, a sound collection function (may be used as an example of the UI function), a power supply function and an external communication function, for example. Note that the placement, shown in FIG. 2, of the function unit 30 is only an example. Alternatively, when, for example, the function unit 30 has a display function as the predetermined function, the function unit 30 (display unit) having the display function is provided so as to cover the region 1A, which is inside the circle 1C, of the lens part 10, so that a wearer (user) recognizes an image displayed thereon. In addition, when the function unit 30 (display unit) having the display function is provided so as to cover the region 1A, the circuit unit 20 is provided in the region 1B, which is a peripheral region outside the display unit 26, so as not to hinder images displayed on the display unit.

The pair of contact lenses 100 (contact lenses 1R and 1L) according to the embodiment respectively include the function units 30 (first and second function units 30R and 30L) having mutually different functions and operate in coordination with each other through the radio communication processing units 22 and the antennas 23. Providing the function units 30 having mutually different functions respectively to the pair of contact lenses 100 (contact lenses 1R and 1L) can make an area for placing the function units 30 smaller than when both are provided to one of the contact lenses 1.

Conceivable combinations of such different functions include combinations of "an imaging function and a display/illumination/storage/battery/external communication/UI function," "a display function and an illumination/storage/battery/external communication/UI function," and "a storage function and a battery/external communication/UI function," for example. In addition, combinations of subdivided imaging functions such as "a special imaging (zoom/infrared/ultraviolet imaging) function and a normal imaging function," "a distant-view imaging function and a near-view imaging function" are also conceivable. As described above, there are various combinations of different functions, which are not particularly limited. However, specific examples of coordinated operation of different functions performed by the pair of contact lenses 100 according to each of the present embodiments will be described in detail in the next "2. Embodiments."

Hereinabove, the basic appearance configuration of the contact lenses 1 has been described. However, the configuration of the circuit unit 20 according to the embodiment is not limited to the example shown in FIG. 1, but may additionally have a battery (power supply unit). In addition, the antenna 23 and the radio communication processing unit 22 of the circuit unit 20 may have a function of receiving power supply, and can receive power supply from an external power supply device (not shown) by a method such, for example, as an electromagnetic induction method, an electric wave method or an electromagnetic field resonance method. Moreover, in addition to being connected by radio to the other one, worn on the other eye, of the contact lenses 1, the radio communication processing unit 22 and the antenna 23 according to the present embodiments may also be connected by radio to an external communication terminal (a smartphone or the like carried by the user, for example). Note that the arrangement of the components of the circuit unit 20 shown in FIG. 1 is only an example, and the configuration of the circuit unit 20 according to this embodiment may be different from that shown in FIG. 1.

Next, by using multiple embodiments, specific description will be given of the coordinated operation of different functions performed by the pair of contact lenses 100.

«2. Embodiments»

<2-1. First Embodiment>

Firstly, with reference to FIGS. 3 to 4, description will be given of coordinated operation according to a first embodiment in which one of the contact lenses 1 has an imaging function, and in which the other one of the contact lenses 1 has a display function.

(2-1-1. Configuration)

Figure 3:
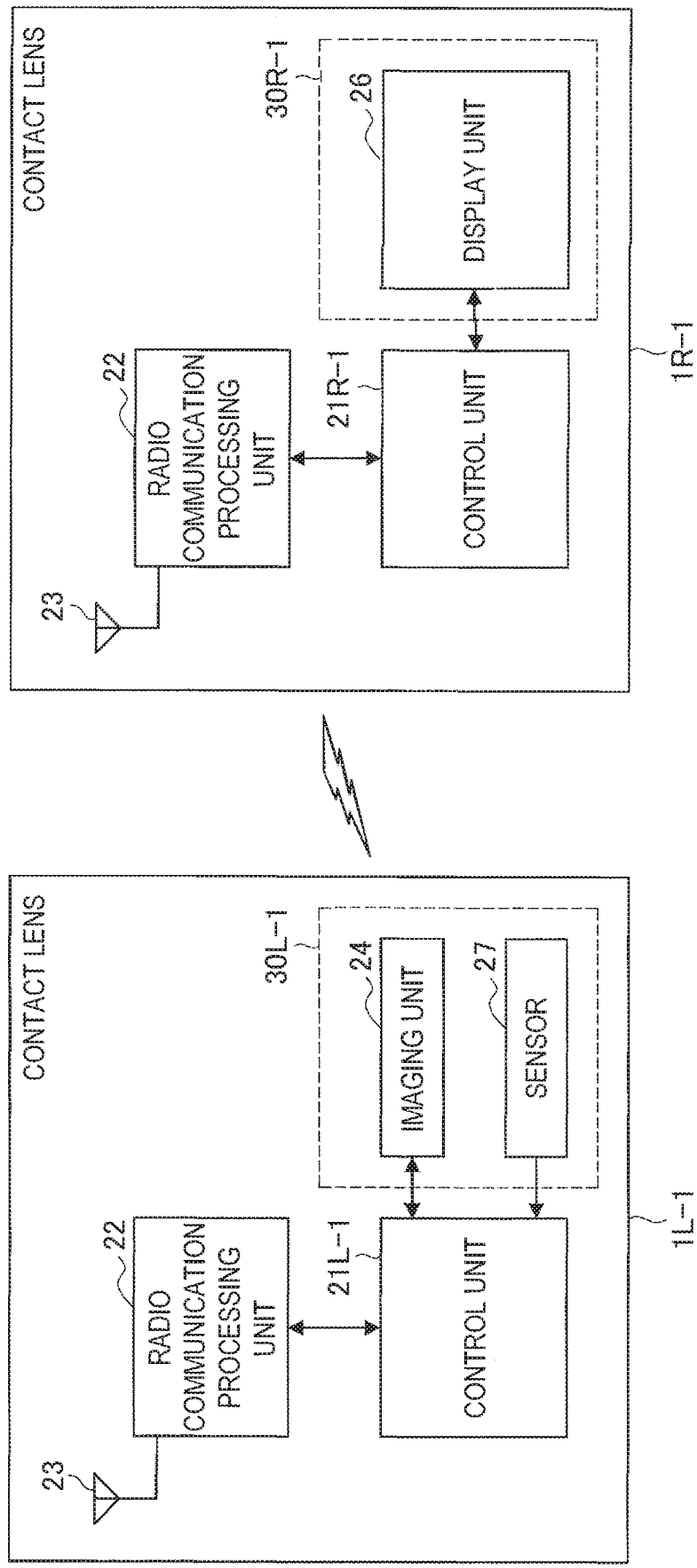
FIG. 3 is a block diagram showing a configuration of a pair of contact lenses according to a first embodiment, which are formed of a contact lens to be worn on a left eye and a contact lens to be worn on a right eye.

FIG. 3 is a block diagram showing a configuration of the pair of contact lenses 100 according to the first embodiment, which are formed of a contact lens 1L-1 to be worn on the left eye 4L and a contact lens 1R-1 to be worn on the right eye 4R.

As shown in FIG. 3, the contact lens 1L-1 has a control unit 21L-1, the radio communication processing unit 22, the antenna 23 and a function unit 30L-1. The function unit 30L-1 includes an imaging unit 24 and a sensor 27.

(Imaging Unit 24)

The imaging unit 24 (camera) has a lens system, a drive system and a solid state image sensor array and the like. The lens system includes an imaging lens, a diaphragm, a zoom lens, a focusing lens and the like. The drive system causes the lens system to perform a focusing operation and a zooming operation. The solid state image sensor array photoelectrically converts imaging light acquired by the lens system to generate imaging signals, and may be materialized, for example, with a charge coupled device (CCD) sensor array or a complementary metal oxide semiconductor (CMOS) sensor array.

The imaging lens is provided so that the imaging direction thereof can coincide with the eye-gaze direction of the user wearing the contact lenses 1.

In addition, the imaging unit 24 has an imaging signal processing unit configured to perform processing on signals acquired from the solid state image sensors to acquire imaging signals as digital data. For example, the imaging signal processing unit may perform eye-shake correction for correcting blurring of an imaged image due to eyeball movement. The imaging unit 24 outputs, to the control unit 21L-1, an imaged image (digital data) thus acquired.

(Sensor 27)

The sensor 27 is any of various sensors for sensing information on an outside world (surrounding environment) around the contact lenses 1, and is materialized with a sensor such, for example, as a piezoelectric sensor (example of a pressure sensor), an infrared sensor or an acceleration sensor. The sensor 27 according to this embodiment is used for detecting a camera activation command, an imaging command and a camera end command. The sensor 27 outputs a sensing result to the control unit 21L-1.

(Control Unit 21L-1)

The control unit 21L-1 detects various commands based on sensing results by the sensor 27, and controls the components of the contact lens 1L-1 in accordance with the various commands thus detected. In addition, the control unit 21L-1 performs control so that the contact lenses 1L-1 and 1R-1 can operate in coordination with each other. More specifically, the control unit 21L-1 performs control so that a display unit 26, which is provided to the other contact lens 1R-1, can display an image imaged by the imaging unit 24, for example.

Hereinabove, the specific description has been given of the configuration of the contact lens 1L-1 according to this embodiment. Meanwhile, as shown in FIG. 3, the contact lens 1R-1 has a control unit 21R-1, the radio communication processing unit 22, the antenna 23 and a function unit 30R-1. The function unit 30R-1 includes the display unit 26.

(Display Unit 26)

In the display unit 26, multiple display elements (not shown) are arranged. Each display element is formed, for example, of a liquid crystal display device, an organic electroluminescence (EL) display device, a field emission display (FED) display device or the like. The display elements are arranged in a matrix on a curved surface (curved surface having an approximately spherical shape, for example) corresponding to the surface of a human eye (or an eye of a non-human animal when the animal wears the contact lenses 1). The display elements, each of which has a display area, may each display an independent image, or may collectively display a single image as a whole.

The display areas are arranged so as to cover the entire area of the region 1A (see FIG. 1) which is inside the circle 1C. Since the diameter D2 of the circle 1C is set to a value approximately equal to or larger than the maximum diameter D1 of the pupil 3 (the maximum diameter of the inner circumferential circle 2A of the iris 2), the display areas cover the entire surface of the pupil 3 at all times irrespective of the diameter value of the inner circumferential circle 2A of the iris 2. Accordingly, light of images on the larger number of display areas reliably forms an image on the retina of the eyeball. Note that, in this embodiment, the diameter D2 of the circle 1C is set to a value smaller than a diameter D3 of an outer circumferential circle 2B of the iris 2, but may be larger than the diameter D3.

In addition, the display elements are closely arranged at a pitch fine enough to allow a person to recognize a single image therefrom as a whole (so as not to cause partial lack of the image).

While displaying no image, the display unit 26 allows light from outside to pass through, thus allowing the user to visually recognize images of the outside (scenes in the real world).

(Control Unit 21R-1)

The control unit 21R-1 performs control so that the display unit 26 can display an imaged image transmitted from the contact lens 1L-1 through the antenna 23 and the radio communication processing unit 22.

Hereinabove, the specific description has been given of the configuration of the contact lenses 1L-1 and 1R-1. The above configuration enables the contact lens 1R-1, worn on the right eye 4R, to display an image imaged by the contact lens 1L-1, worn on the left eye 4L.

(2-1-2. Operation Processing)

Then, with reference to FIG. 4, description will be given of operation processing performed by the pair of contact lenses 100 according to the first embodiment. FIG. 4 is a sequence diagram illustrating exemplary coordinated processing according to the first embodiment.

Figure 4:
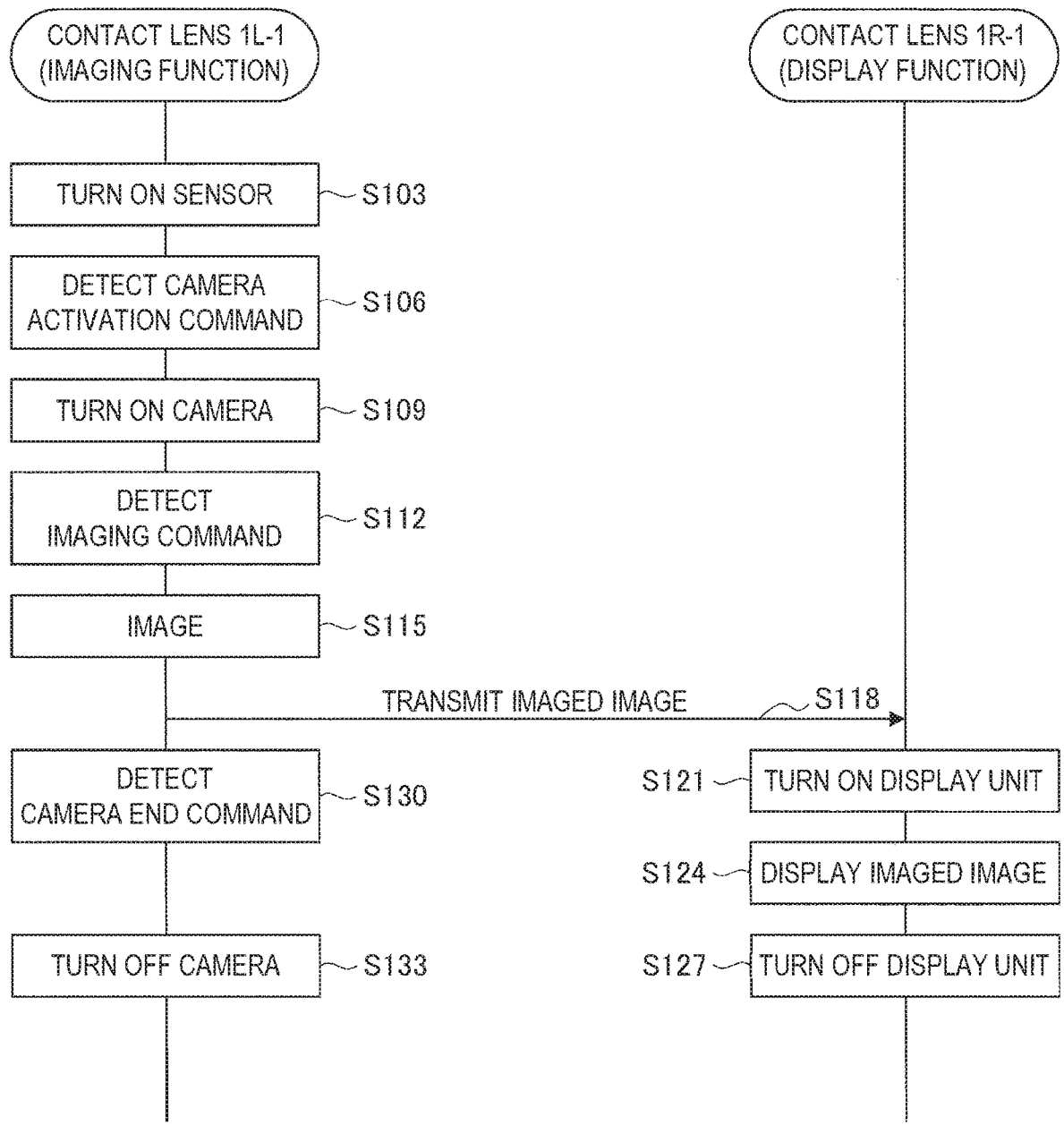
FIG. 4 is a sequence diagram illustrating exemplary coordinated processing according to the first embodiment.

As shown in FIG. 4, firstly, in step S103, the sensor 27 of the contact lens 1L-1 is turned ON. Specifically, for example, upon power supply to the contact lens 1L-1 or upon receiving a predetermined trigger signal from outside (from an external communication terminal, such as a smartphone or a tablet terminal, carried by the user), the sensor 27 becomes powered on. Upon powered ON, the sensor 27 outputs a sensing result to the control unit 21L-1.

Next, in step S106, the control unit 21L-1 detects the camera activation command based on the sensing result by the sensor 27. Specifically, for example, when the piezoelectric sensor (example of the sensor 27) is configured to detect opening and closing of an eyelid contacting the contact lens 1L-1, the control unit 21L-1 may detect, as the "camera activation command," the user's action of closing the eyelid twice.

Then, in step S109, upon detecting the "camera activation command," the control unit 21L-1 activates the imaging unit 24.

Next, in step S112, the control unit 21L-1 detects the imaging command (shutter command) based on a sensing result by the sensor 27. Specifically, for example, the control unit 21L-1 detects, as the "imaging command," the user's action of consciously closing the eyelid that contacts the contact lens 1L-1 (of closing the eyelid for more than 0.5 seconds, for example).

Then, in step S115, upon detecting the "imaging command," the control unit 21L-1 causes the imaging unit 24 to image a subject.

Next, in step S118, the control unit 21L-1 transmits the image imaged by the imaging unit 24 to the imaging command received from the contact lens 1R-1 through the antenna 23 and the radio communication processing unit 22.

Then, in step S121, upon receiving the imaged image from the contact lens 1L-1, the control unit 21R-1 of the contact lens 1R-1 turns ON the display unit 26.

Then, in step S124, the control unit 21R-1 performs control so that the display unit 26 can display the imaged image received from the contact lens 1L-1. This enables the user to view, on the contact lens 1R-1, the image imaged by the other contact lens 1L-1.

Then, in step S127, the control unit 21R-1 turns OFF the display unit 26. The timing to turn OFF the display unit 26 may be either a timing when a predetermined time passes after the imaged image is displayed thereon or a timing when a "display unit end command" is detected. The "display unit end command" may be either transmitted from the contact lens 1L-1 or, if the sensor 27 is provided also to the contact lens 1R-1, detected based on a sensing result by the sensor 27.

Meanwhile, in step S130, the control unit 21L-1 of the contact lens 1L-1 detects the "camera end command" based on a sensing result by the sensor 27 therein. Specifically, for example, the control unit 21L-1 detects, as the "camera end command," the user's action of consciously closing the eyelid that contacts the contact lens 1L-1 three times.

Thereafter, in step S133, upon detecting the "camera end command," the control unit 21L-1 turns OFF the imaging unit 24.

Hereinabove, the specific description has been given of the coordinated operation according to the first embodiment. This embodiment enables the pair of contact lenses 100 to perform the coordinated operation of the imaging function and the display function.

<2-2. Second Embodiment>

Next, with reference to FIGS. 5 to 6, description will be given of coordinated operation according to a second embodiment in which one of the contact lenses 1 has the imaging function, and in which the other one of the contact lenses 1 has an illumination function.

(2-2-1. Configuration)

Figure 5:
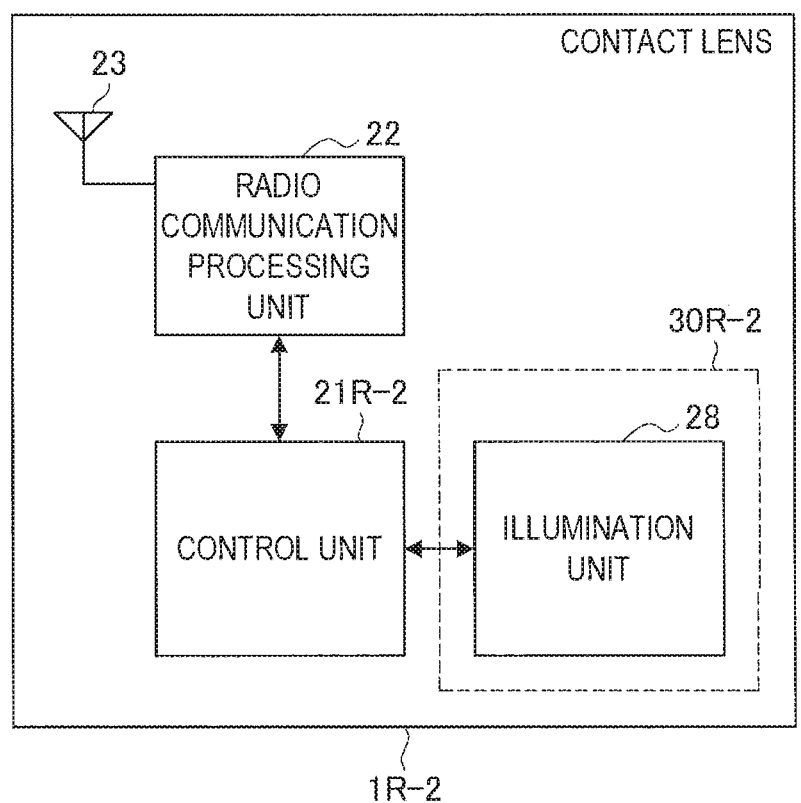
FIG. 5 is a block diagram showing a configuration of a contact lens to be worn on a right eye according to a second embodiment.

FIG. 5 is a block diagram showing a configuration of a contact lens 1R-2 to be worn on the right eye 4R according to the second embodiment. Note that the pair of contact lenses 100 according to this embodiment are formed of a contact lens 1L-2 to be worn on the left eye 4L and the contact lens 1R-2 to be worn on the right eye 4R. The contact lens 1L-2 has a configuration similar to that of the contact lens 1L-1 shown in FIG. 3, and thus the description thereof will be omitted.

As shown in FIG. 5, the contact lens 1R-2 has a control unit 21R-2, the radio communication processing unit 22, the antenna 23 and a function unit 30R-2. The function unit 30R-2 includes an illumination unit 28.

(Illumination Unit 28)

The illumination unit 28, which is provided in the region 1B of the lens part 10, is formed of a light emitting unit and a light emission circuit configured to cause the light emitting unit to emit light. The illumination unit 28 performs a light emitting operation in accordance with control by the control unit 21R-2. Since the light emitting unit is attached so as to illuminate the front of the user who wearing the contact lens 1R-2 on the eyeball 4A, the illumination unit 28 can illuminate in the imaging direction (which is approximately the same as the user's eyesight direction) of the imaging unit 24 of the contact lens 1L-2.

(Control Unit 21R-2)

The control unit 21R-2 controls the ON and OFF of the illumination unit 28 in accordance with a command transmitted from the contact lens 1L-2 through the antenna 23 and the radio communication processing unit 22.

Hereinabove, the specific description has been given of the configuration of the contact lens 1R-2. The above configuration enables the contact lens 1R-2, worn on the right eye 4R, to perform illumination control in coordination with the contact lens 1L-2, worn on the left eye 4L.

(2-2-2. Operation Processing)

Then, with reference to FIG. 6, description will be given of operation processing performed by the pair of contact lenses 100 according to the second embodiment. FIG. 6 is a sequence diagram illustrating exemplary coordinated processing according to the second embodiment.

Figure 6:
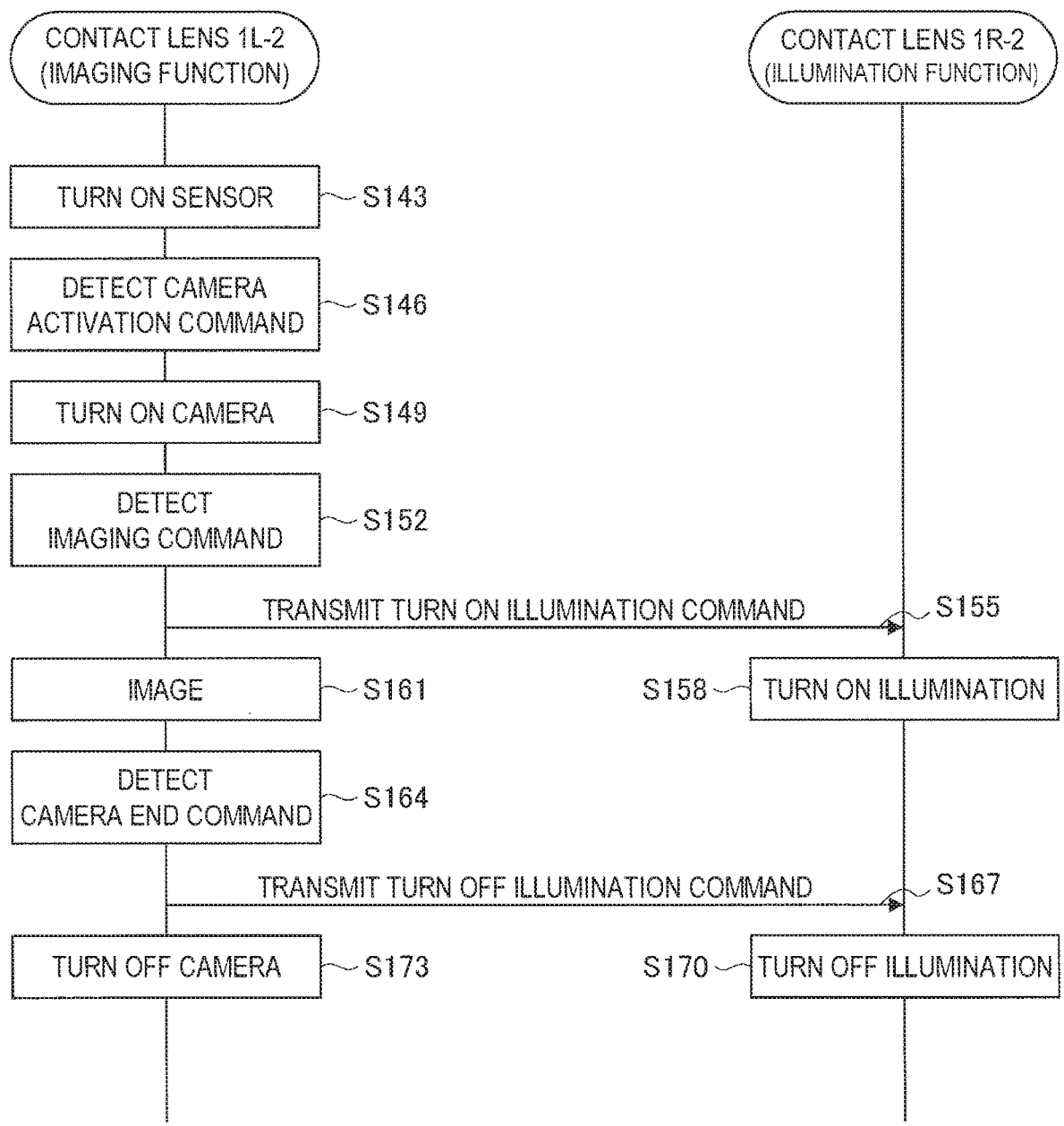
FIG. 6 is a sequence diagram illustrating exemplary coordinated processing according to the second embodiment.

The processing in steps S143 to S152 shown in FIG. 6 is similar to the processing in steps S103 to S112 shown in FIG. 4, and thus the description thereof will be omitted.

Then, in step S155, upon detecting the "imaging command" (shutter command), the control unit 21L-1 transmits a turn ON illumination command to the contact lens 1R-2 through the antenna 23 and the radio communication processing unit 22.

Next, in step S158, upon receiving the turn ON illumination command from the contact lens 1L-2, the control unit 21R-2 of the contact lens 1R-2 performs control to turn ON the illumination unit 28.

Then, in step S161, while the illumination unit 28 of the contact lens 1R-2 is turned ON, a control unit 21L-2 of the contact lens 1L-2 causes the imaging unit 24 to image a subject. This enables the coordinated operation in which the contact lens 1L-2 performs imaging while the other contact lens 1R-2 illuminates in the imaging direction. The image imaged by the imaging unit 24 may be either stored in a memory area included in the control unit 21L-2, or transmitted to an external communication terminal (a smartphone or the like carried by the user) through the antenna 23 and the radio communication processing unit 22.

Next, in step S164, the control unit 21L-2 detects the "camera end command" based on a sensing result by the sensor 27. Specifically, for example, the control unit 21L-2 detects, as the "camera end command," the user's action of consciously closing the eyelid that contacts the contact lens 1L-2 three times.

Then, in step S167, upon detecting the "camera end command," the control unit 21L-2 transmits a turn OFF illumination command to the contact lens 1R-2 through the antenna 23 and the radio communication processing unit 22.

Then, in step S170, the control unit 21R-2 of the contact lens 1R-2 performs control to turn OFF the illumination unit 28 in accordance with the turn OFF illumination command received from the contact lens 1L-2.

Thereafter, in step S173, upon detecting the "camera end command," the control unit 21L-2 of the contact lens 1L-2 turns OFF the imaging unit 24.

Hereinabove, the specific description has been given of the coordinated operation according to the second embodiment. This embodiment enables the pair of contact lenses 100 to perform the coordinated operation of the imaging function and the illumination function.

<2-3. Third Embodiment>

Next, with reference to FIGS. 7 to 8, description will be given of coordinated operation according to a third embodiment in which one of the contact lenses 1 has an UI function, and in which the other one of the contact lenses 1 has the imaging function.

(2-3-1. Configuration)

Figure 7:
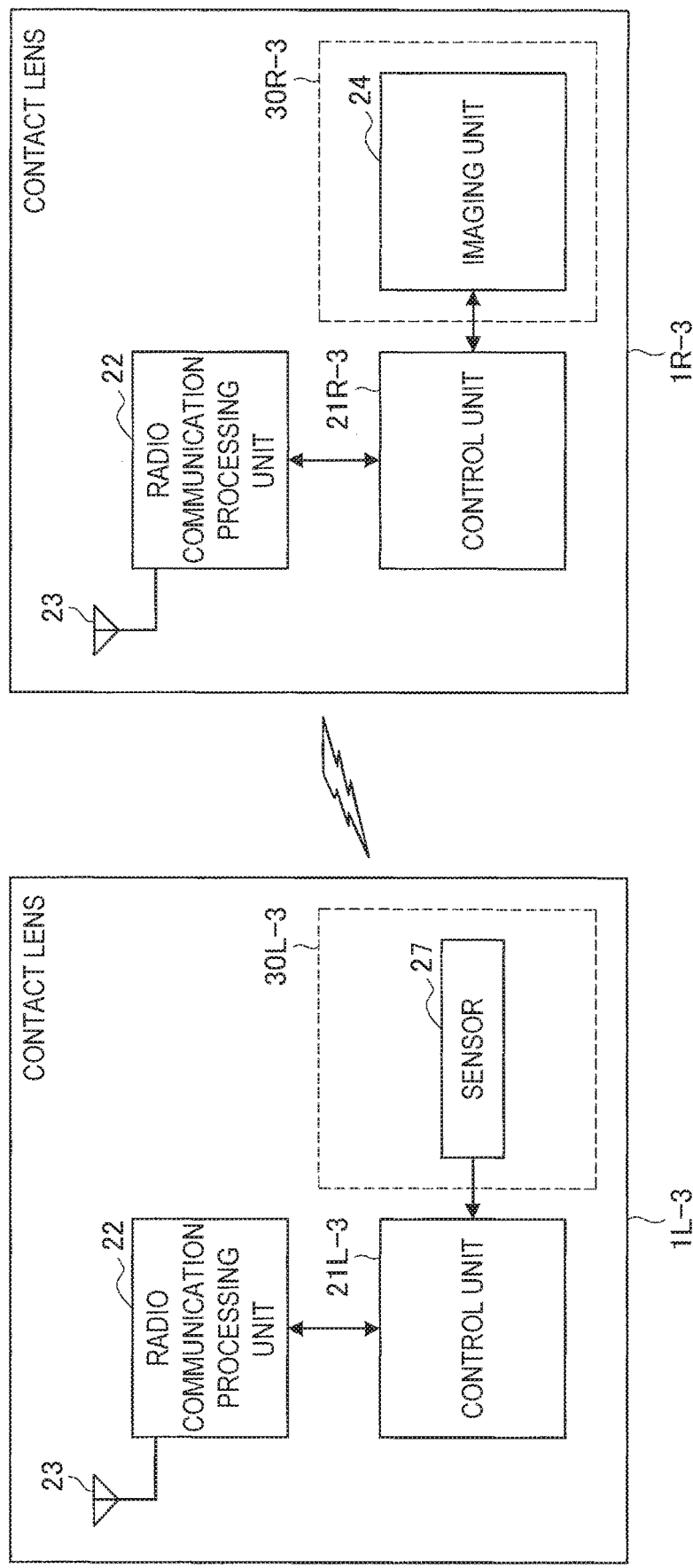
FIG. 7 is a block diagram showing a configuration of a pair of contact lenses according to a third embodiment, which are formed of a contact lens to be worn on a left eye and a contact lens to be worn on a right eye.

FIG. 7 is a block diagram showing a configuration of the pair of contact lenses 100 according to the third embodiment, which are formed of a contact lens 1L-3 to be worn on the left eye 4L and a contact lens 1R-3 to be worn on the right eye 4R.

As shown in FIG. 7, the contact lens 1L-3 has a control unit 21L-3, the radio communication processing unit 22, the antenna 23 and a function unit 30L-3. The function unit 30L-3 includes a sensor 27.

The sensor 27 has already been described in the first embodiment with reference to FIG. 3, and thus the detailed description thereof will be omitted in this embodiment.

The control unit 21L-3 detects the camera activation command, the imaging command and the camera end command based on sensing results by the sensor 27, and transmits the detected commands to the contact lens 1R-3 through the antenna 23 and the radio communication processing unit 22.

Hereinabove, the specific description has been given of the configuration of the contact lens 1L-3 according to this embodiment. As shown in FIG. 7, the contact lens 1L-3 has the user interface (UI) function of causing the sensor 27 to receive user operations. Meanwhile, as shown in FIG. 7, the contact lens 1R-3 has a control unit 21R-3, the radio communication processing unit 22, the antenna 23 and a function unit 30R-3. The function unit 30R-3 includes the imaging unit 24.

The imaging unit 24 has already been described in the first embodiment with reference to FIG. 3, and thus the detailed description thereof will be omitted in this embodiment.

The control unit 21R-3 controls the imaging operation performed by the imaging unit 24 in accordance with the commands transmitted from the contact lens 1L-3.

Hereinabove, the specific description has been given of the configuration of the contact lenses 1L-3 and 1R-3. The above configuration enables the contact lens 1L-3, worn on the left eye 4L, to detect user operations (commands), and enables the imaging unit 24 of the contact lens 1R-3, worn on the right eye 4R, to be controlled in accordance with the detected user operations.

(2-3-2. Operation Processing)

Then, with reference to FIG. 8, description will be given of operation processing performed by the pair of contact lenses 100 according to the third embodiment. FIG. 8 is a sequence diagram illustrating exemplary coordinated processing according to the third embodiment.

Figure 8:
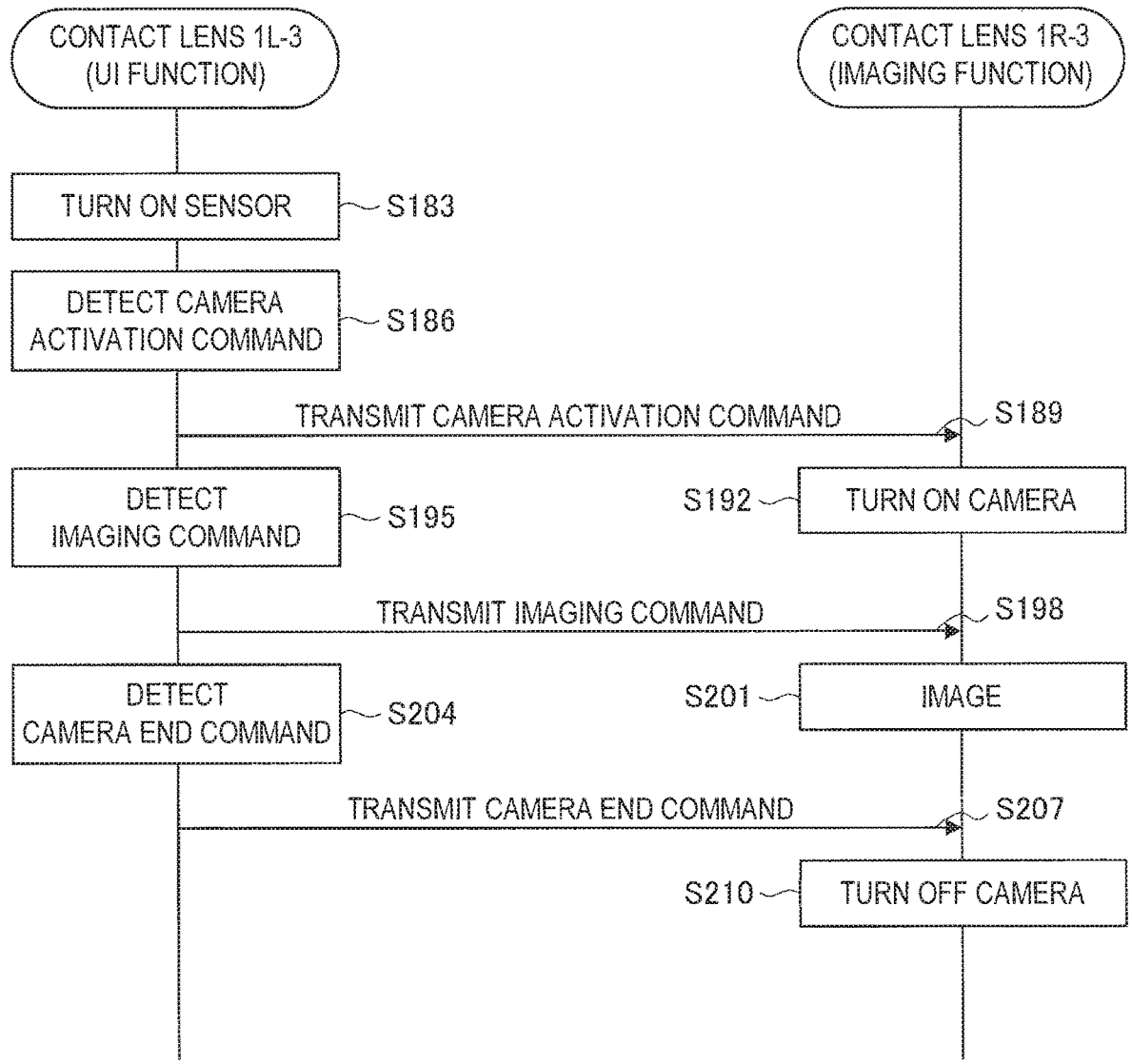
FIG. 8 is a sequence diagram illustrating exemplary coordinated processing according to the third embodiment.

The processing in steps S183 and S186 shown in FIG. 8 is similar to the processing in steps S103 and S106 shown in FIG. 4, and thus the description thereof will be omitted.

Then, in step S189, upon detecting the "camera activation command" based on a sensing result by the sensor 27, the control unit 21L-3 of the contact lens 1L-3 transmits the camera activation command to the contact lens 1R-3 through the antenna 23 and the radio communication processing unit 22.

Next, in step S192, the control unit 21R-3 of the contact lens 1R-3 activates the imaging unit 24 in accordance with the camera activation command received from the contact lens 1L-3.

Then, in step S195, the control unit 21L-3 of the contact lens 1L-3 detects the imaging command (shutter command) based on a sensing result by the sensor 27.

Next, in step S198, the control unit 21L-3 transmits the imaging command to the contact lens 1R-3 through the antenna 23 and the radio communication processing unit 22.

Then, in step S201, in accordance with the imaging command received from the contact lens 1L-3, the control unit 21R-3 of the contact lens 1R-3 performs control to cause the imaging unit 24 to image a subject.

Then, in step S204, the control unit 21L-3 of the contact lens 1L-3 detects the "camera end command" based on a sensing result by the sensor 27. Specifically, for example, the control unit 21L-3 detects, as the "camera end command," the user's action of consciously closing the eyelid that contacts the contact lens 1L-3 three times.

Next, in step S207, the control unit 21L-3 transmits the camera end command to the contact lens 1R-3 through the antenna 23 and the radio communication processing unit 22.

Thereafter, in step S210, the control unit 21R-3 of the contact lens 1R-3 turns OFF the imaging unit 24 in accordance with the camera end command received from the contact lens 1L-3.

Hereinabove, the specific description has been given of the coordinated operation according to the third embodiment. This embodiment enables the pair of contact lenses 100 to perform the coordinated operation of the UI function (operation input function) and the imaging function.

<2-4. Fourth Embodiment>

In the third embodiment described above, the contact lens 1L-3 has the UI function of detecting user operations (blinks, for example) by using the sensor 27 (a piezoelectric sensor, for example). However, the UI function according to the present embodiments is not limited to one using a detection method based on a sensing result by the sensor 27. Alternatively, the commands (user operations) may be detected on the basis of sound collected by a sound pickup unit (microphone, or hereinafter also referred to as mic), for example. Accordingly, hereinafter, description will be given of coordinated operation according to a fourth embodiment in which one of the contact lenses 1 has an UI function enabling sound input, and in which the other one of the contact lenses 1 has the imaging function, with reference to FIGS. 9 to 10.

(2-4-1. Configuration)

Figure 9:
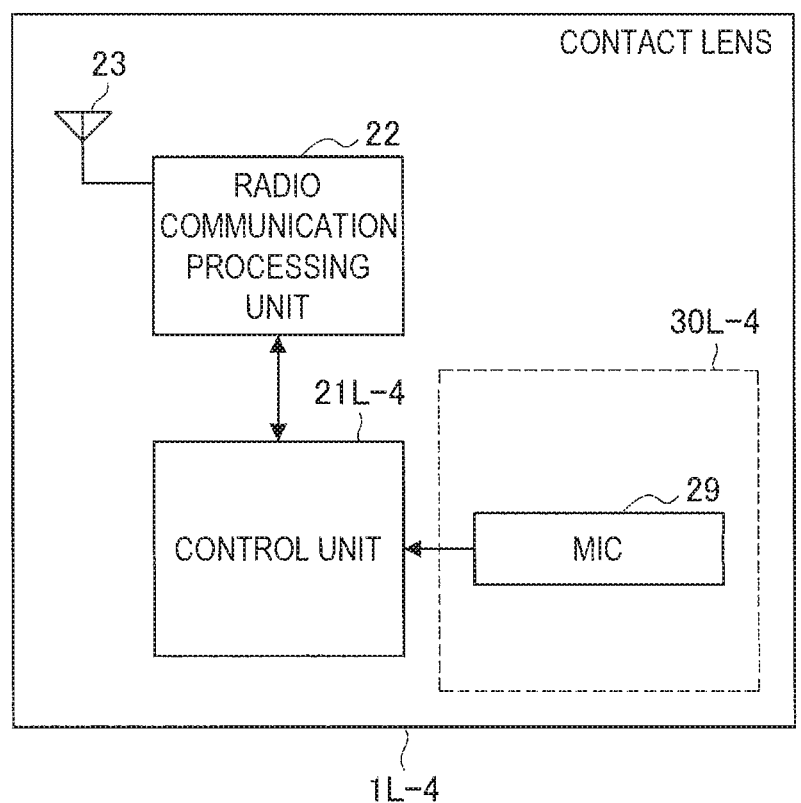
FIG. 9 is a block diagram showing a configuration of a contact lens to be worn on a left eye according to a fourth embodiment.

FIG. 9 is a block diagram showing a configuration of a contact lens 1L-4 to be worn on the left eye 4L according to the fourth embodiment. Note that the pair of contact lenses 100 according to this embodiment are formed of the contact lens 1L-4 to be worn on the left eye 4L and a contact lens 1R-4 to be worn on the right eye 4R. The contact lens 1R-4 has a configuration similar to that of the contact lens 1R-3 shown in FIG. 7, and thus the description thereof will be omitted.

As shown in FIG. 9, the contact lens 1L-4 has a control unit 21L-4, the radio communication processing unit 22, the antenna 23 and a function unit 30L-4. The function unit 30L-4 includes a mic (sound pickup unit) 29.

(Mic 29)

The mic 29, which is provided to the lens part 10, collects sound, such as the user's voice, from the outside world, and outputs the collected sound signals to the control unit 21L-4. In addition, waterproof functionality may be applied to the mic 29 according to this embodiment. The mic 29 may be materialized with a structure capable of collecting underwater sound.

(Control Unit 21L-4)

The control unit 21L-4 detects the camera activation command, the imaging command (shutter command) and the camera end command based on sound signals collected by the mic 29. In addition, the control unit 21L-4 performs control so that the detected commands can be transmitted to the contact lens 1R-4 through the antenna 23 and the radio communication processing unit 22.

Hereinabove, the specific description has been given of the configuration of the contact lens 1L-4 according to this embodiment. The above configuration enables the contact lens 1L-4, worn on the left eye 4L, to detect sound-based user operations (commands), and enables the imaging operation of the contact lens 1R-4, worn on the right eye 4R, to be controlled in accordance with the detected commands.

(2-4-2. Operation Processing)

Figure 10:
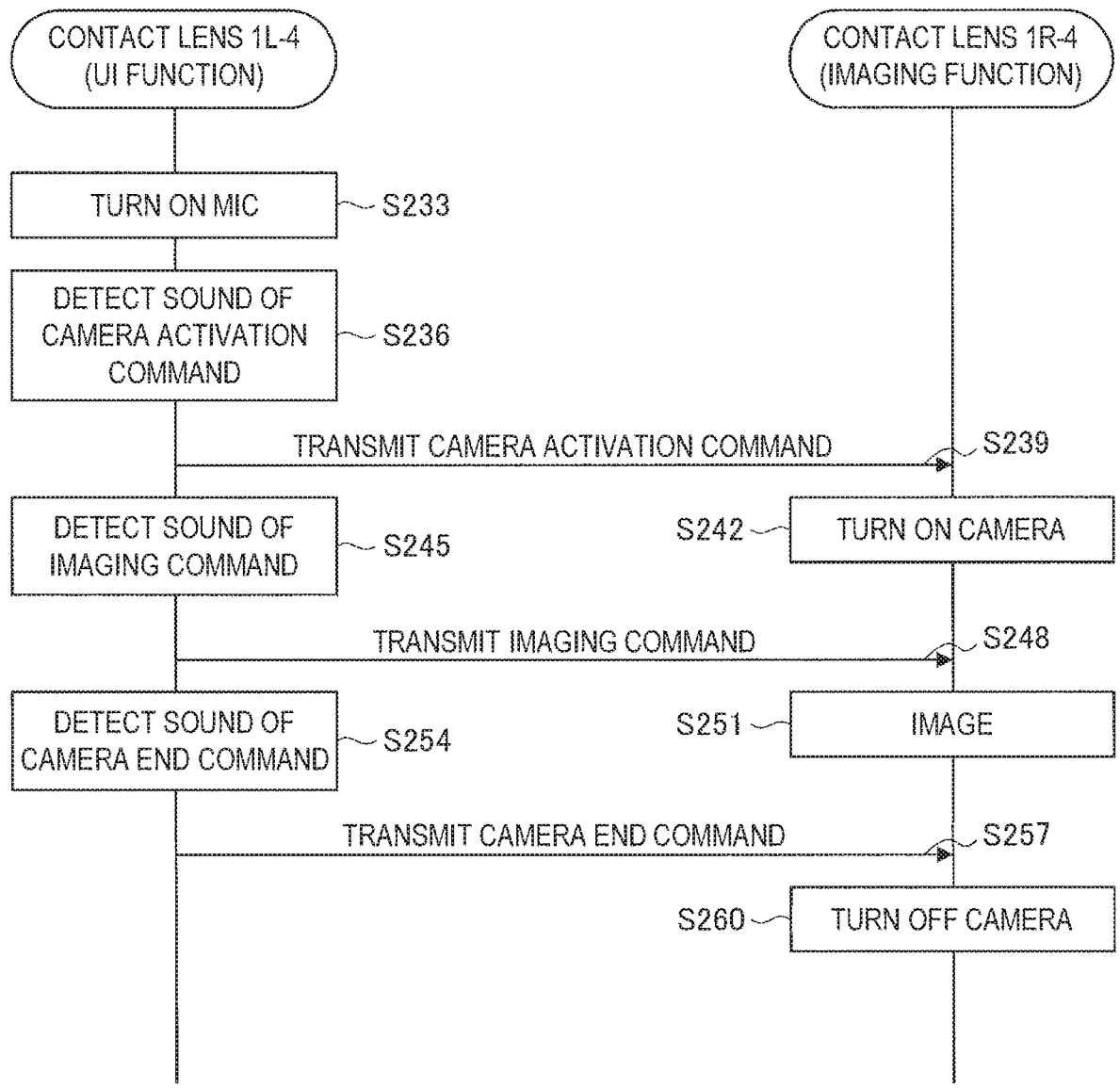
FIG. 10 is a sequence diagram illustrating exemplary coordinated processing according to the fourth embodiment.

Then, with reference to FIG. 10, description will be given of operation processing performed by the pair of contact lenses 100 according to the fourth embodiment. FIG. 10 is a sequence diagram illustrating exemplary coordinated processing according to the fourth embodiment.

As shown in FIG. 10, firstly, in step S233, the mic 29 of the contact lens 1L-4 is turned ON. Specifically, for example, upon power supply to the contact lens 1L-4 or upon receiving a predetermined trigger signal from outside (from an external communication terminal, such as a smartphone or a tablet terminal, carried by the user), the mic 29 becomes powered on. Upon powered ON, the mic 29 collects sound therearound and outputs, to the control unit 21L-4, sound signals thus collected.

Then, in step S236, by analyzing the sound signals collected by the mic 29 (sound recognition), the control unit 21L-4 detects the camera activation command.

Then, in step S239, upon detecting the "camera activation command," the control unit 21L-4 transmits the camera activation command to the contact lens 1R-4 through the antenna 23 and the radio communication processing unit 22.

Next, in step S242, the control unit 21R-4 of the contact lens 1R-4 activates the imaging unit 24 in accordance with the camera activation command received from the contact lens 1L-4.

Then, in step S245, by analyzing the sound signals collected by the mic 29, the control unit 21L-4 of the contact lens 1L-4 detects the imaging command (shutter command).

Next, in step S248, the control unit 21L-4 transmits the imaging command to the contact lens 1R-4 through the antenna 23 and the radio communication processing unit 22.

Then, in step S251, in accordance with the imaging command received from the contact lens 1L-4, the control unit 21R-4 of the contact lens 1R-4 performs control to cause the imaging unit 24 to image a subject.

Then, in step S254, by analyzing the sound signals collected by the mic 29, the control unit 21L-4 of the contact lens 1L-4 detects the "camera end command."

Next, in step S257, the control unit 21L-4 transmits the camera end command to the contact lens 1R-4 through the antenna 23 and the radio communication processing unit 22.

Thereafter, in step S260, the control unit 21R-4 of the contact lens 1R-4 turns OFF the imaging unit 24 in accordance with the camera end command received from the contact lens 1L-4.

Hereinabove, the specific description has been given of the coordinated operation according to the fourth embodiment. This embodiment enables the pair of contact lenses 100 to perform the coordinated operation of the UI function based on sound input and the imaging function.

<2-5. Fifth Embodiment>

In the pair of contact lenses 100 according to any of the first to fourth embodiments, each of the contact lenses 1R and 1L either has a battery (power supply unit) or receives power supply from an external power supply device. However, the configurations of the pair of contact lenses 100 according to the present embodiments are not limited to this. Alternatively, the pair of contact lenses 100 may perform coordinated operation in which one of the contact lenses 1R and 1L is provided with a battery, and supplies power to the other one of the contact lenses 1R and 1L. Hereinafter, description will be given of such coordinated power supply operations as a fifth embodiment, with reference to FIGS. 11 to 12.

(2-5-1. Configuration)

Figure 11:
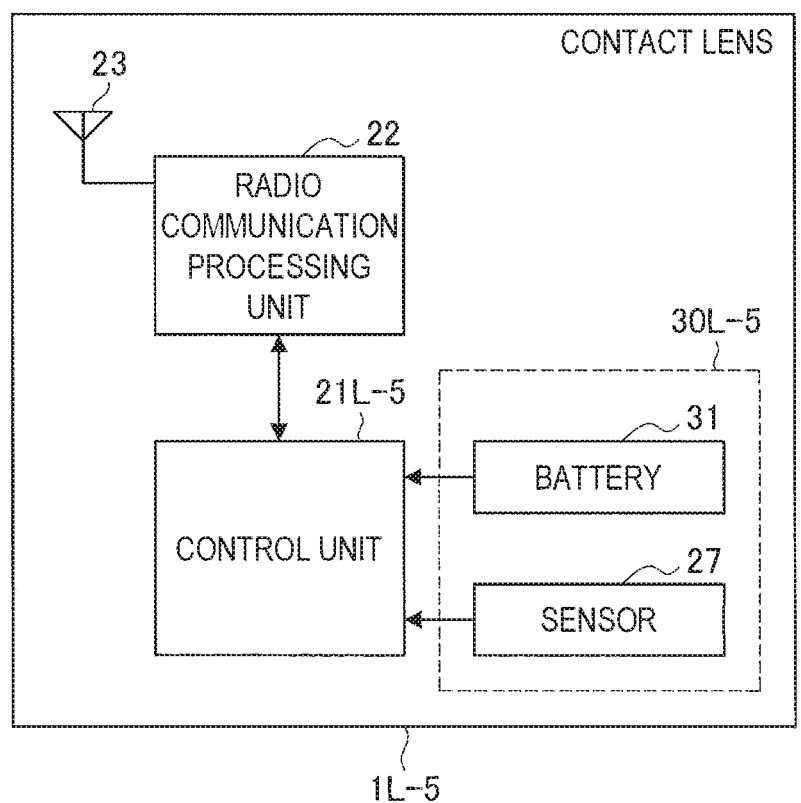
FIG. 11 is a block diagram showing a configuration of a contact lens to be worn on a left eye according to a fifth embodiment.

FIG. 11 is a block diagram showing a configuration of a contact lens 1L-5 to be worn on the left eye 4L according to the fifth embodiment. Note that the pair of contact lenses 100 according to this embodiment are formed of the contact lens 1L-5 having a battery function and to be worn on the left eye 4L and a contact lens 1R-5 having an imaging function and to be worn on the right eye 4R. The contact lens 1R-5 has a configuration similar to that of the contact lens 1R-3 shown in FIG. 7, and thus the description thereof will be omitted.

As shown in FIG. 11, the contact lens 1L-5 has a control unit 21L-5, the radio communication processing unit 22, the antenna 23 and a function unit 30L-5. The function unit 30L-5 includes the sensor 27 and a battery 31.

The sensor 27 has already been described in the first embodiment with reference to FIG. 3, and thus the detailed description thereof will be omitted in this embodiment.

The battery 31 has a function of supply power to the components of the contact lens 1L-5. The battery 31 may be materialized either with a solar photovoltaic power generator, or with a power supply receiving processor configured to receive power supply from an external power supply device through the antenna 23.

The control unit 21L-5 detects the camera activation command, the imaging command and the camera end command based on sensing results by the sensor 27, and transmits the detected commands to the contact lens 1R-5 through the antenna 23 and the radio communication processing unit 22. In addition, the control unit 21L-5 controls power transmission to the contact lens 1R-5 in accordance with the detected commands.

Hereinabove, the specific description has been given of the configuration of the contact lens 1L-5 according to this embodiment. The above configuration enables the contact lens 1L-5, worn on the left eye 4L, to control power supply to the contact lens 1R-5, worn on the right eye 4R, in accordance with the detected commands.

(2-5-2. Operation Processing)

Figure 12:
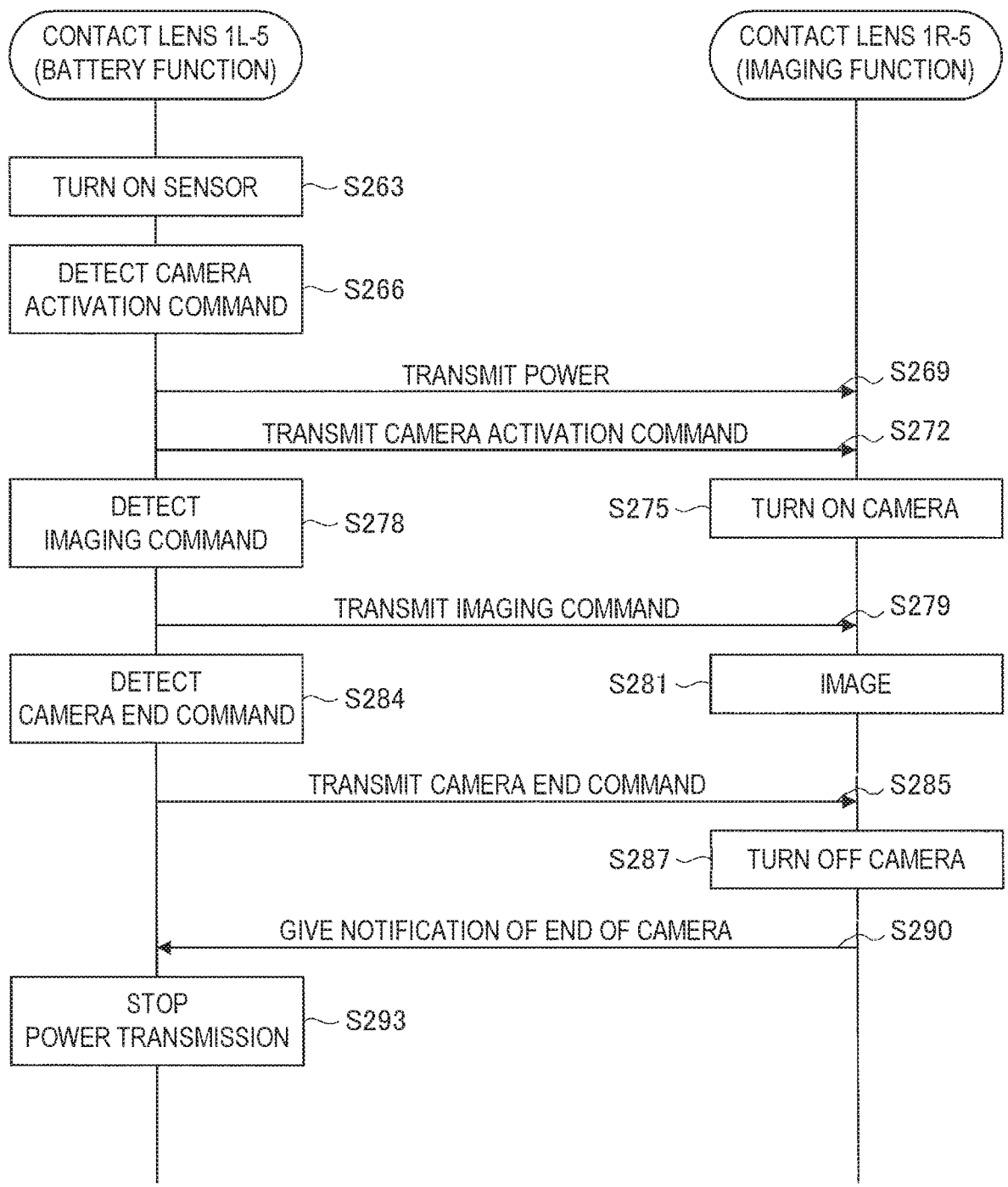
FIG. 12 is a sequence diagram illustrating exemplary coordinated processing according to the fifth embodiment.

Then, with reference to FIG. 12, description will be given of operation processing performed by the pair of contact lenses 100 according to the fifth embodiment. FIG. 12 is a sequence diagram illustrating exemplary coordinated processing according to the fifth embodiment.

As shown in FIG. 12, firstly, in step S263, the sensor 27 of the contact lens 1L-5 is turned ON.

Then, in step S266, the control unit 21L-5 detects the camera activation command based on a sensing result by the sensor 27. Specifically, for example, when the piezoelectric sensor (example of the sensor 27) is configured to detect opening and closing of an eyelid contacting the contact lens 1L-5, the control unit 21L-5 may detect, as the "camera activation command," the user's action of closing the eyelid twice.

Next, in step S269, the control unit 21L-5 performs control to transmit the power supplied by the battery 31 to the contact lens 1R-5. The power transmission may be performed by a method such, for example, as an electromagnetic induction method, an electric wave method or an electromagnetic field resonance method. In the subsequent steps, power is continuously transmitted to the contact lens 1R-5.

Then, in step S272, the control unit 21L-5 transmits the camera activation command to the contact lens 1R-5.

In the subsequent steps S275 to S287, processing similar to that in steps S195 to S210 shown in FIG. 8 is performed. In other words, the contact lens 1L-5 detects the imaging command (shutter command) and the camera end command, and the imaging unit 24 of the contact lens 1R-5 is controlled in accordance with the commands. In these steps, the components of the contact lens 1R-5 are driven using the power continuously transmitted from the contact lens 1L-5.

Next, in step S290, the control unit 21R-5 of the contact lens 1R-5 notifies the contact lens 1L-5 that the imaging unit 24 becomes turned OFF.

Thereafter, in step S293, upon receiving the notification that the imaging unit 24 becomes turned OFF, the control unit 21L-5 of the contact lens 1L-5 stops the power transmission to the contact lens 1R-5.

Hereinabove, the specific description has been given of the coordinated operation according to the fifth embodiment. This embodiment enables the pair of contact lenses 100 to perform the coordinated operation of the battery function (power supply function) and the imaging function.

<2-6. Sixth Embodiment>

In the pair of contact lenses 100 according to any of the first to fifth embodiments, the antenna 23 and the radio communication processing unit 22 of each of the contact lenses 1R and 1L have only to have functions to enable the contact lenses 1R and 1L to communicate with each other. Accordingly, providing one of the contact lenses 1R and 1L with a function (external communication function) to enable communication with an external communication terminal suffices to achieve the coordinated operation of the external communication function and another function. Examples of the external communication terminal include communication terminals, such as a smartphone, a mobile phone terminal or a tablet terminal, carried by the user, and a server on a network. Hereinafter, description will be given of such coordinated operation of the external communication function and another function (imaging function, for example) as a sixth embodiment, with reference to FIGS. 13 to 14.

(2-6-1. Configuration)

Figure 13:
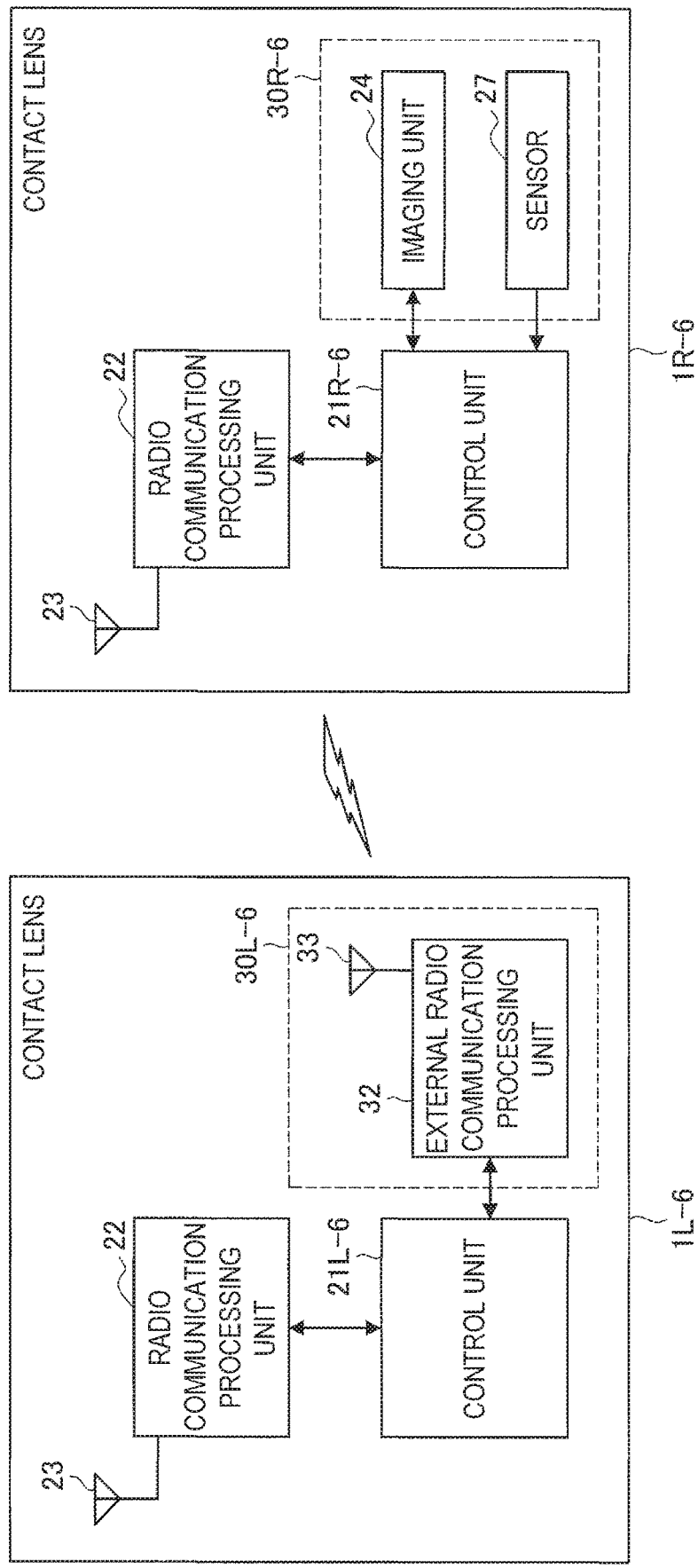
FIG. 13 is a block diagram showing a configuration of a pair of contact lenses according to a sixth embodiment, which are formed of a contact lens to be worn on a left eye and a contact lens to be worn on a right eye.

FIG. 13 is a block diagram showing a configuration of the pair of contact lenses 100 according to the sixth embodiment, which are formed of a contact lens 1L-6 to be worn on the left eye 4L and a contact lens 1R-6 to be worn on the right eye 4R.

As shown in FIG. 13, the contact lens 1L-6 has a control unit 21L-6, the radio communication processing unit 22, the antenna 23 and a function unit 30L-6. The function unit 30L-6 includes an external radio communication processing unit 32 and an antenna 33.

The antenna 33 is connected by radio to an external communication terminal such as a communication terminal, such as a smartphone, a mobile phone terminal or a tablet terminal, carried by the user, or a server on a network. Meanwhile, the external radio communication processing unit 32 performs processing on radio communication to and from the external communication terminal through the antenna 33. Note that, as an alternative to the configuration including the antenna 33, the contact lens 1L-6 may communicate with the external communication terminal by radio through a human body as a substitute for the antenna 33.

The control unit 21L-6 performs control so that the imaged image received from the contact lens 1R-6 through the antenna 23 and the radio communication processing unit 22 can be transmitted to the external communication terminal through the antenna 33 and the external radio communication processing unit 32.

Hereinabove, the specific description has been given of the configuration of the contact lens 1L-6 according to this embodiment. Meanwhile, as shown in FIG. 13, the contact lens 1R-6 has a control unit 21R-6, the radio communication processing unit 22, the antenna 23 and a function unit 30R-6. The function unit 30R-6 includes the imaging unit 24 and the sensor 27.

The imaging unit 24 and the sensor 27 have already been described in the first embodiment with reference to FIG. 3, and thus the detailed description thereof will be omitted in this embodiment.

The control unit 21R-6 controls the imaging operation performed by the imaging unit 24 in accordance with sensing results by the sensor 27, and performs control so that an image imaged by the imaging unit 24 can be transmitted to the contact lens 1L-6.

Hereinabove, the specific description has been given of the configuration of the contact lenses 1L-6 and 1R-6. The above configuration enables the contact lens 1L-6, worn on the left eye 4L, to transmit, to the external communication terminal, an image imaged by the imaging unit 24 of the contact lens 1R-6, worn on the right eye 4R.

(2-6-2. Operation Processing)

Then, with reference to FIG. 14, description will be given of operation processing performed by the pair of contact lenses 100 according to the sixth embodiment. FIG. 14 is a sequence diagram illustrating exemplary coordinated processing according to the sixth embodiment.

Firstly, in steps S303 to S315 shown in FIG. 14, processing similar to that in steps S103 to S115 shown in FIG. 4 is performed. In other words, the contact lens 1R-6 detects the camera activation command, the imaging command (shutter command) and the camera end command based on sensing results by the sensor 27, and the imaging operation performed by the imaging unit 24 is controlled in accordance with the commands.

Then, in step S318, the control unit 21R-6 of the contact lens 1R-6 transmits an image imaged by the imaging unit 24 to the contact lens 1L-6 through the antenna 23 and the radio communication processing unit 22.

Next, in step S321, the control unit 21L-6 of the contact lens 1L-6 performs control so that the imaged image received from the contact lens 1R-6 can be transmitted to the external communication terminal through the antenna 33 and the external radio communication processing unit 32.

Meanwhile, in step S324, the control unit 21R-6 of the contact lens 1R-6 detects the "camera end command" based on a sensing result by the sensor 27. Specifically, for example, the control unit 21R-6 detects, as the "camera end command," the user's action of consciously closing the eyelid that contacts the contact lens 1R-6 three times.

Thereafter, in step S327, upon detecting the "camera end command," the control unit 21R-6 turns OFF the imaging unit 24.

Hereinabove, the specific description has been given of the coordinated operation according to the sixth embodiment. This embodiment enables the pair of contact lenses 100 to perform the coordinated operation of the external communication function and the imaging function. Note that the coordinated operation according to this embodiment is not limited to the coordinated operation of the external communication function and the imaging function, but may but may alternatively be, for example, the coordinated operation of the external communication function and the display function. In this alternative coordinated operation, the contact lens 1L having the external communication function may receive a video image from a predetermined server on a network, and the other contact lens 1R having the display function may display the received video image, for example.

Alternatively, the coordinated operation according to this embodiment may be the coordinated operation of the external communication function and a storage function. In this coordinated operation, the contact lens 1L having the external communication function may receive data from an external communication terminal, and the other contact lens 1R having the storage function may store therein the received data, for example. As used herein, the storage function can be implemented by a storage unit configured to read and write data on a predetermined recording medium. Examples of the recording medium are variously conceivable, including fixed memory such as flash memory, and the storage unit has only to have read and write capability compatible for the recording medium to be employed.

«3. Conclusion»

As described above, the contact lens 1R and the contact lens 1L constituting the pair of contact lenses 100 according to any of the present embodiments have mutually different functions, and perform coordinated operation of these functions. Thereby, the contact lenses are significantly improved in convenience.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, there may be developed a computer program for causing the hardware, such as a CPU, ROM and RAM, embedded in the circuit unit 20 of each of the contact lenses 1 to achieve the functions of the control unit 21 of the contact lens 1. In addition, there may be provided a computer-readable storage medium storing therein the computer program.

In each of the above embodiments, it has been described that the coordinated operation is performed while the contact lenses 1R and 1L are worn on the respective eyes. However, exception handling processing may be executed upon removal of any one of the contact lenses 100 paired together. For example, upon failing to receive any reply from any one of the contact lenses, the other contact lens may perform control to stop the processing of transmitting an imaged image, a command or power.

The contact lenses 1 according to any of the present embodiments may be applied to any types of widely-known soft or hard contact lenses having different lens properties and lens diameters.

Moreover, in the above flowcharts, it does not matter if the processing of transmitting each command does not end until the command completion notification is received from the command's destination. For example, the "processing of transmitting the turn ON illumination command" shown in S155 in FIG. 6 ends upon receipt of a command completion notification (turn ON illumination notification) from the contact lens 1R-2, and then the "imaging processing" shown in S161 is performed. This enables the contact lens 1L-2 to avoid performing the imaging processing before the contact lens 1R-2 turns on illumination.

Additionally, the present technology may also be configured as below.

(1)

A pair of contact lenses including:

a pair of lens parts configured to be worn on respective eyeballs of both eyes;

a first function unit provided to one of the pair of lens parts; and a second function unit provided to the other one of the pair of lens parts, the second function unit having a function different from a function of the first function unit.

(2)

The pair of contact lenses according to (1), further including:

a communication unit that enables the pair of lens parts to communicate.

(3)

The pair of contact lenses according to (2), wherein the communication unit is provided to each of the pair of lens parts.

(4)

The pair of contact lenses according to any one of (1) to (3), wherein the first and second function units are at least any of an imaging unit, an illumination unit, a display unit, a storage unit, a sensor, a sound pickup unit and a power supply unit.

(5)

The pair of contact lenses according to any one of (1) to (4), further including:

a control unit that performs control in a manner that the first and second function units operate in coordination with each other.

(6)

The pair of contact lenses according to (5), wherein the control unit is provided to each of the pair of lens parts.

(7)

A contact lens including:

a lens part configured to be worn on an eyeball;

a function unit provided to the lens part;

a communication unit that is provided to the lens part and that is capable of communicating with an external device; and a control unit that performs control in a manner that the function unit operates in coordination with the external device in accordance with information that the communication unit receives from the external device.

(8)

The contact lens according to (7), wherein the control unit performs control in a manner that a control signal for controlling a function of the external device is transmitted to the external device through the communication unit.

(9)

The contact lens according to (7) or (8), wherein the external device is another one of the contact lenses that is worn on the other eyeball.

(10)

A storage medium having a program stored therein, the program causing a computer to function as:

a function unit provided to a lens part configured to be worn on an eyeball;

a communication unit that is provided to the lens part and that is capable of communicating with an external device; and a control unit that performs control in a manner that the function unit operates in coordination with the external device in accordance with information that the communication unit receives from the external device.

REFERENCE SIGNS LIST 1, 1R (1R-1 to 1R-6), 1L (1L-1 to 1L-6) contact lens
100 pair of contact lenses
2 iris
3 pupil
4R right eye
4L left eye
4A eyeball
10 lens part
20 circuit unit
21 control unit
22 radio communication processing unit
23 antenna
24 imaging unit
25 storage unit
26 display unit
27 sensor
28 illumination unit
30 (30L-1 to 30L-6, 30R-1 to 30R-6) function unit
31 battery
32 external radio communication processing unit
33 antenna

The invention claimed is:

1. A first contact lens, comprising:

a lens part configured to be worn on a first eyeball;

a communication unit on the lens part, wherein the communication unit is configured to:

communicate with an external device, and receive first information from the external device;

a function unit on the lens part, wherein the function unit is configured to execute a first function based on the first information received from the external device, and the communication unit is further configured to transmit second information to the external device based on the execution of the first function; and a control unit configured to control, based on the first information and the second information, the function unit and the external device such that the function unit operates in coordination with the external device.

2. The first contact lens according to claim 1, wherein the communication unit is further configured to transmit a control signal to the external device, and the control unit is further configured to control a second function of the external device based on the control signal transmitted to the external device.

3. The first contact lens according to claim 2, wherein the first function of the function unit is different from the second function of the external device.

4. The first contact lens according to claim 1, wherein the external device is a second contact lens that is wearable on a second eyeball.

5. The first contact lens according to claim 1, wherein the function unit includes at least one of an imaging unit, an illumination unit, a display unit, a storage unit, a sensor, a sound pickup unit, or a power supply unit.

6. The first contact lens according to claim 1, wherein the external device is an external communication terminal.

7. The first contact lens according to claim 6, wherein the external communication terminal is one of a smartphone, a mobile phone terminal, or a tablet terminal.

8. The first contact lens according to claim 1, further comprising an antenna on an outer periphery of a region of the lens part.

9. A non-transitory computer-readable medium having stored thereon computer-executable instructions, which when executed by a processor of a contact lens, cause the processor to execute operations, the operations comprising:

controlling a communication unit of the contact lens to communicate with an external device, wherein the contact lens includes a lens part that is wearable on an eyeball, and the communication unit is on the lens part;
controlling the communication unit to receive first information from the external device;
controlling, based on the first information received from the external device, a function unit of the contact lens to execute a first function,
wherein the function unit is on the lens part;
controlling the communication unit to transmit second information to the external device based on the execution of the first function; and
controlling, based on the first information and the second information, the function unit and the external device such that the function unit operates in coordination with the external device.

* * * * *